United States Patent
Rauhala et al.

(10) Patent No.: US 6,847,803 B1
(45) Date of Patent: Jan. 25, 2005

(54) METHOD FOR REDUCING INTERFERENCE IN A RECEIVER

(75) Inventors: Jyri Rauhala, Tampere (FI); Olli-Pekka Lundén, Suinula (FI); Marko Erkkilä, Siuro (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/513,665

(22) Filed: Feb. 25, 2000

(30) Foreign Application Priority Data

Feb. 26, 1999 (FI) .................................................. 990423

(51) Int. Cl.[7] .............................................. H04B 15/00
(52) U.S. Cl. ................ 455/63.1; 455/67.11; 455/67.13; 370/252; 370/337; 370/347
(58) Field of Search ............................. 455/276, 277.1, 455/277.2, 78, 63, 423, 63.1, 67.11, 67.13; 370/252, 337, 347

(56) References Cited

U.S. PATENT DOCUMENTS

| | | | | |
|---|---|---|---|---|
| 4,133,979 A | * | 1/1979 | Helliwell et al. | 370/525 |
| 4,214,244 A | | 7/1980 | McKay et al. | 343/18 |
| 4,780,721 A | | 10/1988 | Dobson | 342/178 |
| 5,117,505 A | * | 5/1992 | Talwar | 455/278.1 |
| 5,303,240 A | | 4/1994 | Borras et al. | 370/95.3 |
| 5,483,680 A | * | 1/1996 | Talbot | 455/107 |
| 5,548,838 A | * | 8/1996 | Talwar et al. | 455/304 |
| 5,574,978 A | * | 11/1996 | Talwar et al. | 455/63 |
| 5,584,065 A | * | 12/1996 | Monzello | 455/296 |
| 5,630,223 A | * | 5/1997 | Bahu et al. | 455/296 |
| 5,729,829 A | * | 3/1998 | Talwar et al. | 455/63 |
| 5,742,591 A | * | 4/1998 | Himayat et al. | 370/286 |
| 6,006,092 A | * | 12/1999 | Ward | 455/438 |
| 6,067,448 A | * | 5/2000 | Ho et al. | 455/78 |
| 6,154,655 A | * | 11/2000 | Borst et al. | 455/451 |
| 6,259,752 B1 | * | 7/2001 | Domino et al. | 375/346 |
| 6,295,279 B1 | * | 9/2001 | Lin | 370/252 |
| 6,615,054 B2 | * | 9/2003 | Terry et al. | 455/522 |

FOREIGN PATENT DOCUMENTS

| | | |
|---|---|---|
| DE | 3443466 A1 | 5/1986 |
| DE | 4403612 A1 | 8/1995 |
| FR | 2580448 | 10/1986 |

OTHER PUBLICATIONS

*English Translation of the Abstract for DE 3443466.
**English Translation of the Abstract for DE 4403612.
English Translation of the Abstract and front page only of US 4,847,860.
Patent Abstracts of Japan, Publication No. 09219615 A (English Translation).
Japanese Abstract, Publication Number 11055170, Publication Date Feb. 26, 1999.
Japanese Abstract, Publication Number 02121428, Publication Date May 09, 1990.
"Microwave Engineering" D.M. Pozar, pp. 643–646.

* cited by examiner

Primary Examiner—William Trost
Assistant Examiner—Marcos Torres
(74) Attorney, Agent, or Firm—Perman & Green, LLP

(57) ABSTRACT

A control for noise attenuation is provided which is based on signals received at a time that is different than the assigned receiving time slot of the receiver. Thus, the control is not affected by payload information.

12 Claims, 4 Drawing Sheets

METHOD FOR REDUCING INTERFERENCE IN A RECEIVER

Figure 1B:
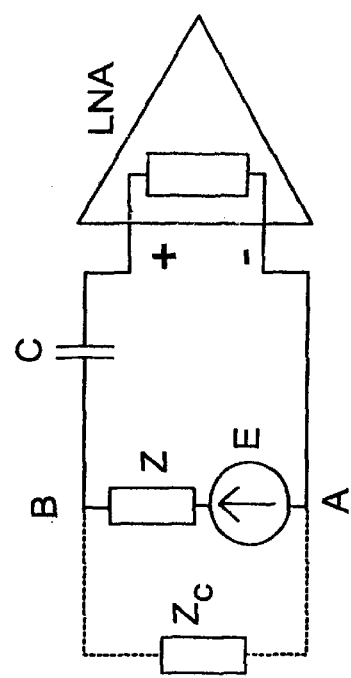

The present invention relates to a method for reducing interference in a receiver for receiving information in receiving time slots, in which receiver a signal is received with at least a first and a second antenna. The invention relates also to a receiver for receiving information in receiving time slots, the receiver comprising a first and a second antenna for receiving signals into a wireless communication device as well as a system. Further, the invention relates to a wireless communication device comprising at least a receiver for receiving information into said wireless communication device in defined receiving time slots, as well as a first and a second antenna for receiving signals. Moreover, the invention relates to a system comprising at least a data processor, a receiver for receiving information in receiving time slots, as well as a first and a second antenna for receiving signals.

In addition to actual information transmitted, a receiver is subjected to various interference signals which may affect the receiving capacity of the receiver. Such interference signals are formed particularly in such electrical devices in which high-frequency and pulse-like signals of sharp edges occur, as in data processors (PC, Personal Computer). In most modern data processors, the processor clock frequencies are already in the range of 250 to 300 MHz. It is known that pulse-like signals, short switching times, high currents, long conductors and circuit-board wirings cause electromagnetic radiation to the environment. The frequency of the electromagnetic radiation is inversely proportional to the signal rise and fall times. The intensity of such radiation is even higher in wires whose length is in the same order of magnitude as the wavelength of the interference signal or which otherwise resonates with the interference signal. The radiation power is proportional to the square of the intensity of current. There are several possibilities of the above-mentioned kind for generation of interference signals in data processors. The intensity of the interference signals can be influenced to some extent by the circuit-board design, wherein sources of interference signals are encapsulated by ground conductors, shields, or the like. In practice, however, it is impossible to achieve a perfect protection against interference, wherein some of the interference will enter the receiver.

It is particularly important to eliminate interference in so-called card phones which are intended to be connected to an expansion card interface or the like in a data processor, wherein such a card phone implemented as an expansion card can be used e.g. as a modem and a facsimile terminal. Such expansion cards comprise e.g. a transmitterreceiver unit for a wireless communication device as well as electronics for controlling the expansion card,. such as a microcontroller unit (MCU), memory means (RAM, ROM, FLASH), a digital signal processor (DSP), analog-to-digital converters (ADC), digital-to-analog converters (DAC), as well as the necessary connection means for connecting with the data processor. At least some of the above-mentioned circuits can be implemented with an application-specific integrated circuit (ASIC), which is known as such.

The transmitter comprises e.g. a modulator for modulating the signal to be transmitted, filters particularly for attenuating interference transmission, one or several mixers in which the modulated signal is mixed with the local oscillator frequency to form a radio-frequency signal, and a power amplifier for amplifying the signal to be transmitted. The amplified signal is fed to an antenna which is coupled with the card e.g. by means of a cable. The receiver comprises e.g. filters for filtering received signals, one or several mixers for converting the received radio-frequency signal to an intermediate frequency or in a directconversion type receiver to the baseband frequency, and a demodulator for demodulating the received signal.

Figure 1A:
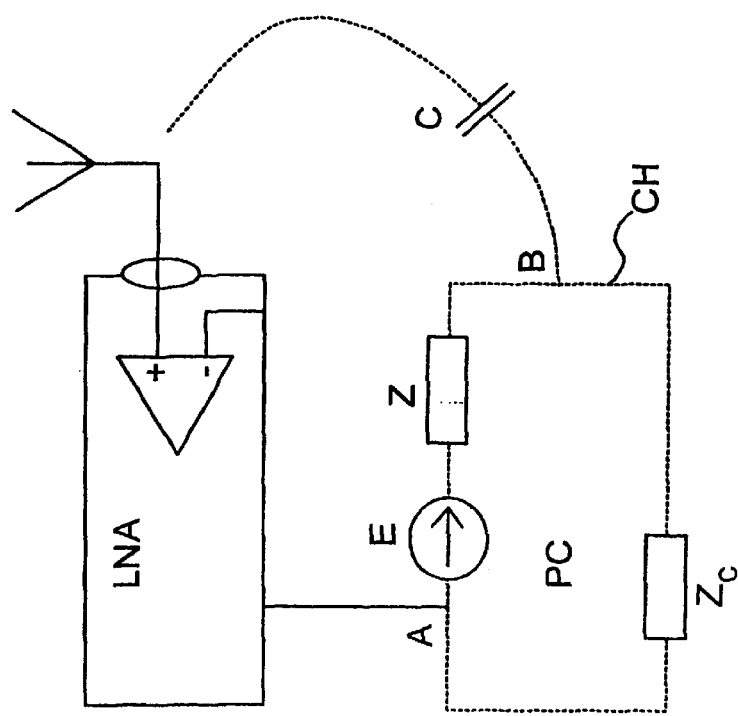

When such an expansion card is connected with a data processor, the distances between the transmitter/receiver unit of the expansion card and the data processor are very short, wherein the intensity of radiation formed in the data processor is very high at the receiver stages. Appended FIGS. 1a, 1b show a mechanism how interference is coupled from a data processor PC to the receiver of an expansion card in principle. High-frequency fields (magnetic fields and electric fields) formed in the data processor PC are coupled to the housing of the data processor PC which is partly of metal, wherein disturbance currents are developed, The dimensions of the housing of the data processor are, in at least some directions, of the same order of magnitude as the wavelengths of the developing high-frequency disturbance, which means that different disturbance voltages may occur in different parts of the housing. Upon perusal between two points A, B, it can be stated that the interference signal develops a voltage between the points A and B (indicated as power supply E in FIG. 1a). The impedance of this power supply is complex, comprising a reactive component depending on the frequency. In FIG. 1a, a broken line CH indicates the housing of the device, in which a high-frequency current is passed between divided impedance Z and Zc. Part of the interference signal is emitted into the environment from the point B. In practical solutions, there are several such interference signal points B, but the situation is simplified here by presenting only one such emission point. Part of this radiation is passed to the antenna of the receiver. This coupling is represented with a capacitor C in FIG. 1a.

In view of the signal/noise ratio (S/N) or the signal/interference ratio (S/I), the most significant part in the receiver is a low noise amplifier LNA. This low noise amplifier LNA amplifies a weak incoming signal to a greater strength. As can be shown from FIG. 1b, the power supply E is coupled between the inverting and non-inverting input terminal of the low noise amplifier LNA. Thus, also the interference signals coupled via the receiving antenna to the receiver are amplified in this low noise amplifier LNA, wherein the actual useful signal and the interference signal can no longer be separated from each other at further receiving stages.

A method is known for attenuating interference in a radio receiver by using two or more receiving antennas, wherein the signals received through the different antennas are delayed to have different phases. The signals with the different phases are summed up and passed to other receiving stages to be demodulated. In this method, the attenuation of interference is based on the fact that the phase shifting block is adjusted to control the phase difference, until the interference signals received through the different antennas substantially eliminate each other. This method is suitable for situations in which there is only one interference signal interfering in the reception. In practical situations, however, there are several sources of interference, wherein the method presented above is not suitable for use in receivers of wireless communication devices. Moreover, the use of the method is complicated by the fact that in continuous transmission, the signal intended to be received, i.e. the useful signal, is also constantly present, wherein it is difficult to separate the interference signal from the useful signal.

In wireless communication devices, the interfering effect of interference signals can be best detected in a weak signal field, i.e. when the wireless communication device is far from the base station. The interference signal may thus cause intermittent fading of the signal to be received, or even dropping of the connection. Also, when the wireless communication device moves from the coverage area of one base station to the area of another base station, interference signals may cause dropping of the connection.

It is an aim of the present invention to present a method for eliminating interference in a receiver, such as a TBMA receiver. The invention is based on the idea that signals are received with two or more antennas, wherein a phase difference is formed between at least two different signals. A reference signal is formed of these signals, wherein the phase difference is adjusted advantageously so that the power of the reference signal in the receiver can be reduced to a minimum. The formation of the reference signal and adjustment are performed during a time slot when no actual useful information is received in the receiver. Moreover, adjustment is not made in a time slot which the transmitter of the wireless communication device uses for transmitting information. The method of the present invention is characterized in that, on the basis of the signals received with said first antenna and second antenna at other moments of time than in said receiving time slot, a reference signal is formed which is used for the uning of the receiver.

The receiver according to the present invention is characterized in that it comprises also means for forming a reference signal on the basis of signals received with at least said first and second antennas at other times than in said receiving time slot, and means for adjusting the receiver on the basis of said reference signal, to attenuate interference effective in the reception of the information.

The wireless communication device according to the present invention is characterized in that it comprises also means for forming a reference signal on the basis of signals received with at least said first and second antennas at other times than in said receiving time slot, and means for adjusting the receiver on the basis of said reference signal, to attenuate interference effective in the reception of the information.

Furthermore, the system according to the present invention is characterized in that the system comprises also means for forming a reference signal on the basis of signals received with at least said first and second antennas at other times than in said receiving time slot, and means for adjusting the receiver on the basis of said reference signal, to attenuate interference effective in the reception of the information.

The present invention gives significant advantages to solutions for attenuating interference according to prior art. In the attenuation of interference according to the invention, the adjustment is performed when there is no actual useful information to be received, whereby the adjustment is based on a noise situation corresponding better to the reality. Thus, useful information does not affect the adjustment. In a situation in which the adjustment is made in a time slot preceding a receiving time slot, the noise situation does not normally change significantly in relation to the receiving time slot, wherein as good an attenuation of interference as possible is achieved. Moreover, attenuation of interference according to the invention can be implemented in a relatively simple manner, e.g. by adding a control algorithm to be used in the adjustment in the application software of the digital signal processor. Also, attenuation of interference according to the invention is very adaptive, wherein changes in noise situations are taken into account in the adjustment. The receiver according to the invention is not as sensitive to interference as receivers of prior art, wherein also dropping of a connection in a weak signal field occurs less frequently.

In the following, the present invention will be described in more detail with reference to the appended drawings, in which FIG. 1a illustrates the coupling of interference in the receiver of a card phone connected to a data processor in a skeleton diagram, FIG. 1b shows a reduced equivalent circuit in the situation of

Figure 2:
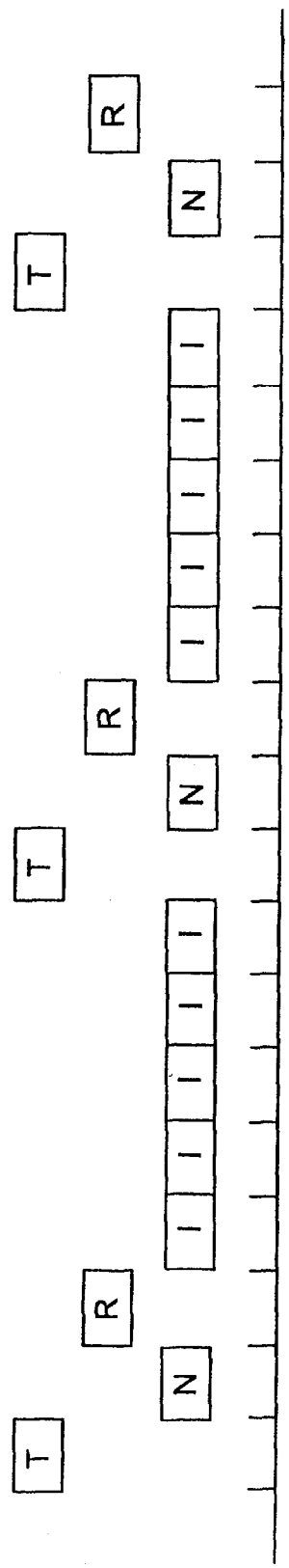
Figure 3:
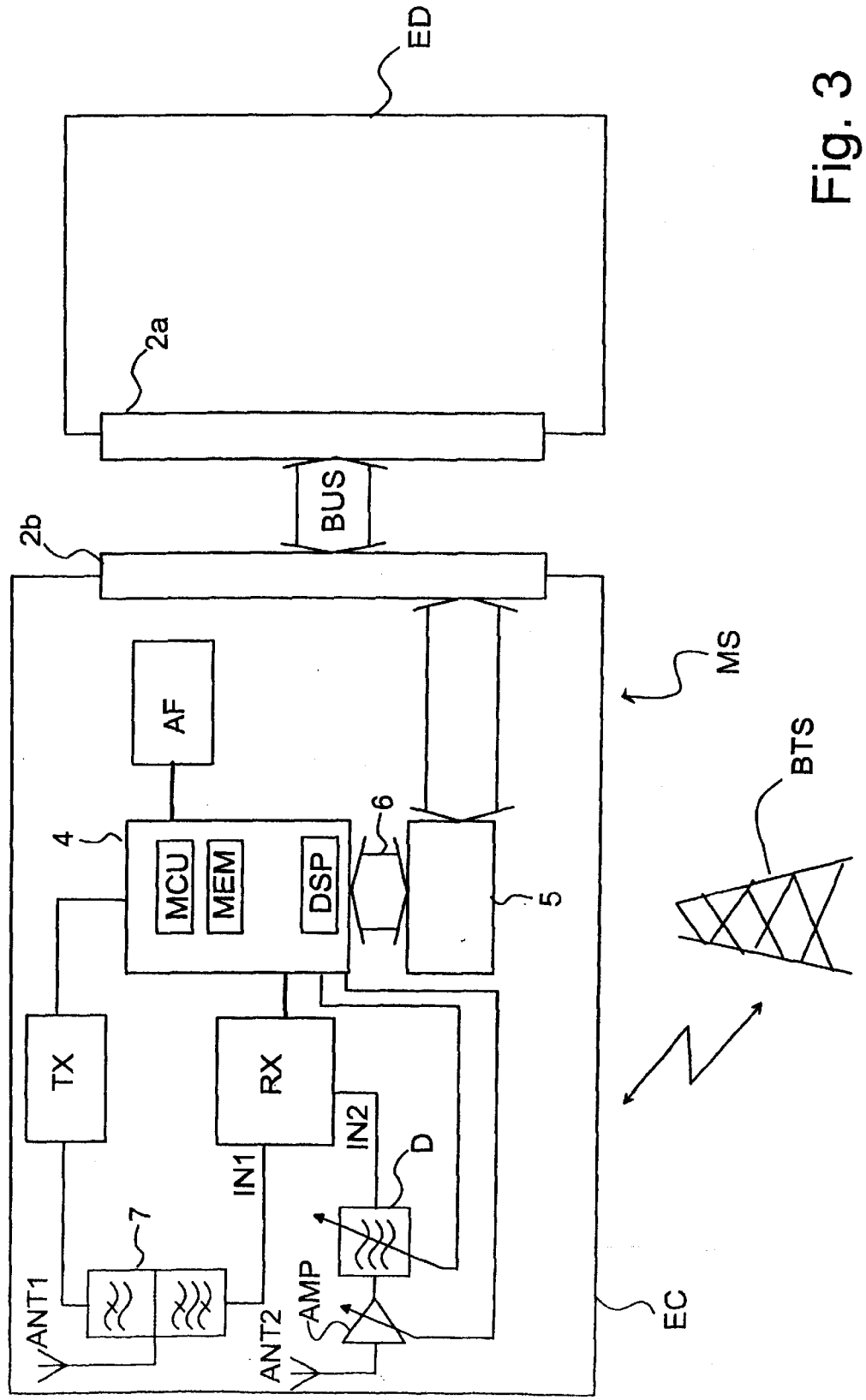
Figure 4:
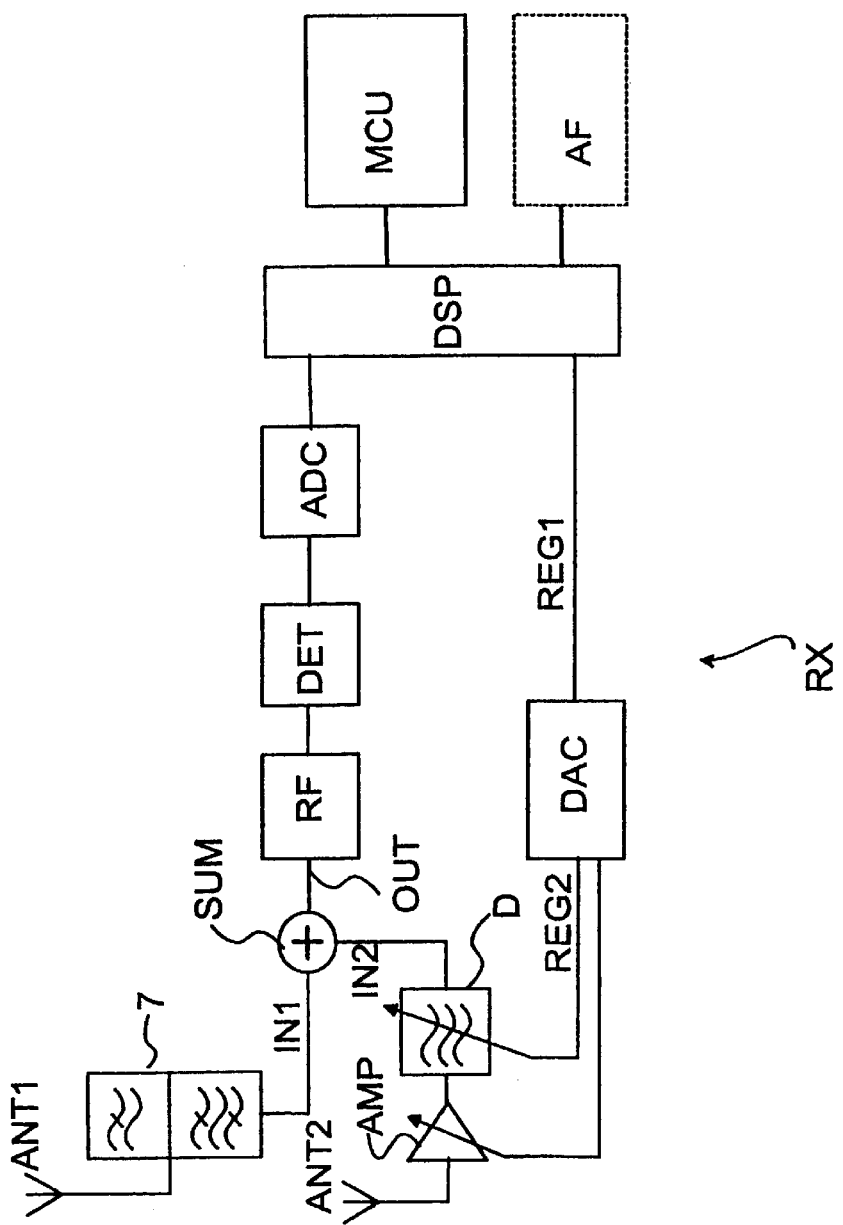

FIG. 1a,

FIG. 2 shows a time slot in the TDMA system with respect to a wireless communication device, FIG. 3 is a reduced block chart showing a wireless communication device according to a preferred embodiment of the invention, and FIG. 4 is a reduced block chart showing a TDMA receiver according to a preferred embodiment of the invention.

In the following, the invention will be described in a GSM mobile cornmunication system, but the invention can also be applied in other mobile communication systems based on time division multiple access TDMA, such as US-TDMA, PDC, DECT and PHS. In TDMA based mobile communication systems, the transmission and reception between a wireless communication device and a base transceiver station takes place in different time slots, as illustrated in a reduced way in FIG. 2. In the GSM mobile communication network, each physical channel is divided into eight time slots. The time-span consisting of eight time slots is called a TDMA frame. Normally, all of the eight time slots are not allocated to one wireless communication device, but for example in the GSM system normally six of eight (6/8) time slots are idle slots with respect to one wireless communication device. One time slot is typically used for transmission and, correspondingly, one time slot for reception. In some situations, the wireless communication device may have several connections, for example a circuit-switched connection and a packet-switched connection. Thus, the number of idle slots is not necessarily the number mentioned above but smaller. In any case, during a connection, some of the time slots are idle slots with respect to the wireless communication device, and they can be utilized for measuring the adjustment of interference attenuation and for calculating the control values.

In the example of FIG. 2, transmitting time slots are indicated with the letter T, receiving time slots with the letter R, idle slots to be used in the attenuation of interference with the letter N, and other idle slots with the letter I. It is obvious that in practical applications and situations, the grouping of said different time slots can also be different from that shown in the example of FIG. 2.

The wireless communication device implemented as an expansion card shown in the appended FIG. 3 will be used as a preferred example of implementing the wireless communication device MS of the invention. FIG. 3 shows primarily those blocks of the expansion card EC which are necessary for understanding the invention. The expansion card EC comprises an expansion card connection 2b, whereby the expansion card is arranged to be connected with an electronic device ED, such as a portable data processor. The electronic device ED is equipped with a corresponding expansion card connection 2a, such as a connection complying with the PCMCIA standard. Thus, the expansion card connection 2a of the electronic device comprises preferably a male contact (not shown) to which the expansion card EC is connected by the expansion card connection 2b comprising preferably a female contact (not shown). Hereinbelow, this expansion card connection 2a of the electronic device and the expansion card connection 2b of the expansion card will be primarily referred to with the joint term "expansion card connection", and it will be indicated with the reference numeral 2. This expansion card connection 2 can also be different from a connection complying with the PCMCIA standard. The expansion card connection 2 comprises preferably an address bus, a control bus, and a data bus. These buses are indicated with one bus BUS in the appended FIG. 3, and it is obvious for anyone skilled in the art how these buses can be implemented but the practical implementation of the buses is not relevant in view of understanding this invention.

In the expansion card EC, a control block 4 comprises e.g. a processor, such as a microcontroller unit (MCU), a memory, such as a read only memory (ROM) for storing application software and the like, a random access memory (RAM) e.g. for storing information during the use, and a digital signal processing unit (DSP). Furthermore, the control block comprises means for connecting the processor MCU and the digital signal processing unit DSP in a data transmission connection, for example a dual-port memory circuit (dual-port RAM).

For arranging a data transmission connection between the expansion card EC and the electronic device ED, the expansion card EC is equipped with a bus adapter 5 which is implemented preferably with an application-specific integrated circuit (ASIC). The bus adapter 5 comprises advantageously e.g. expansion bus connection means, a bus adapter control block, a configuration option register (COR), and means for data transmission between the bus adapter 5 and the control block 4. The data transmission connection between the bus adapter 5 and the control block 4 comprises for example two serial buses: a fast asynchronous serial bus (ASIO) and a synchronous serial bus (PCMBUS) which are shown as one bus 6 in the block chart of FIG. 3.

In the expansion card EC of FIG. 3, the transmitter TX is for example a transmitter complying with the GSM standard, to perform e.g. signal modulation, channel coding and amplification, known as such. The signal to be transmitted from the transmitter TX is fed via an antenna adapter 7 to a first antenna ANT1. The antenna adapter 7 prevents e.g. the entry of interference emissions to the first antenna ANT1, and it comprises a band-pass filter for attenuating radio-frequency signals received by the first antenna ANT1 outside the receiving frequency range of the receiver.

FIG. 4 illustrates more closely a receiver RX according to a preferred embodiment of the invention, to be applied e.g. in the expansion card EC of FIG. 3. In the receiver RX, two antennas ANT1, ANT2 are used for receiving signals. Also interference signals are captured by the antennas ANT1, ANT2 to the receiver. The signals received via the first antenna ANT1 are fed to a summing means SUM, directly to a first input IN1. The signals received via the second antenna ANT2 are fed to a phase transfer means D, in which the phase of these signals is shifted. From the phase transfer means D, the signals are fed to the second input IN2. From the output OUT of the summing means, the signal is fed to the receiver pre-stage RF, in which the summed signals are subjected to band-pass filtering and conversion either in a direct conversion or through one or several intermediate frequencies to a baseband signal. This conversion is performed in a way known as such, by mixing the received signal with one or several local oscillator frequencies. For clarity, the local oscillators are not indicated in the appended figures, and they are known as such by anyone skilled in the art.

The signal received from the pre-stage of the receiver is fed to be demodulated in a demodulator DET. The demodulator DET forms an analog signal which is converted into a digital signal in the analog-to-digital converter ADC. After this, the signal in digital format is fed to the digital signal processing unit DSP.

The digital signal processing unit DSP makes signal processing procedures on demodulated signals, e.g. to attenuate noise and interference in the received, demodulated signal, to modify the received, demodulated audio signal according to the earpiece HP or the like used at the time, to attenuate background noise from the microphone signal, etc. In the digital signal processing unit DSP, it is also possible to implement several signal processing algorithms by programming the program commands corresponding to these functions in the application software. Thus, several types of filters can be produced, including those that are not possible or reasonable to implement with analog techniques.

The phase transfer means D used can be for example a delay block with an adjustable delay, or a broadband filter (all-pass filter) with an adjustable phase response. It is an aim to make the amplification of the broadband filter substantially constant in each desired frequency range. The purpose of the phase transfer means D is to produce a phase difference between the signal received via the second antenna ANT2 and the signal received via the first antenna ANT1.

In a known implementation of the phase transfer means D, the signal is passed optionally via a different signal route according to the type of phase shift desired. The phase difference between these different signal routes is provided advantageously by filters or transmission lines.

The phase differences are set by adjusting the phase responses of the filters or the lengths of the transmission lines in a suitable way. In the implementation of the filters, passive components are used, such as inductances and capacitances, as well as active components, if necessary, such as PIN diodes or MESFET transistors. The phase transfer means D may have two or more such signal routes. The selection of the desired signal route can be implemented e.g. with PIN diodes or MESFET transistors. The operation of the phase transfer means D is described in more detail e.g. in "Microwave Engineering" by David M. Pozar, pages 643–646.

At the stage of setting up a call, the wireless communication device MS and the base station perform call set-up signalling, wherein e.g. the wireless communication device MS is synchronized with the base station to determine correct transmission and reception moments. Thus, the wireless communication device MS is transmitted information on the time slot for downlink transmission from the base station BTS to the wireless communication device MS and the time slot for uplink transmission from the wireless communication device MS to the base station BTS. In the wireless communication device MS, the timing is preferably controlled by the processor MCU of the control block.

In a situation of downlink transmission from the base station BTS to the wireless communication device MS, the processor MCU controls the receiver RX to receive a desired useful signal in a receiving time slot R. Thus, the digital signal processing unit DSP processes the received signal, converted to baseband frequency, in a normal way known as such. The received, demodulated signal is fed from the digital signal processing unit DSP further to other stages in the receiver, indicated in the block chart of FIG. 3 in a reduced way as one block AF. In the case of an audio call, the signal is fed either to the earpiece of the wireless communication device MS or possibly to a speaker in an electronic device or a corresponding electroacoustic converter, preferably via the expansion card connection 2.

In the case of a data call or a fax call, the demodulated signal is fed from the digital signal processing unit DSP to be processed further, preferably to the electronic device ED via the expansion card connection 2.

The tuning of the receiver RX to attenuate interference is performed in an idle time slot I, preferably in an idle time slot N preceding the receiving time slot R. Thus, the processor MCU gives the digital signal processing unit information that the received signal is not a useful signal but a interference signal, on the basis of which the attenuation of interference is to be adjusted. For making the adjustment, the strength of the received signal is first measured. Thus, the signal received via the first antenna ANT1 is fed to the summing means SUM, and the signal received via the second antenna ANT2 is fed preferably via the high-frequency amplifier AMP to the phase transfer means D, in which the phase of this signal is shifted. The signal received via the first antenna ANT1 and the signal received via the second antenna ANT2, with the shifted phase, are summed up in the summer SUM.

The amplification of the high-frequency amplifier AMP is preferably adjustable, wherein by adjusting the amplification of the high-frequency amplifier AMP to be suitable each time, the attenuation of the interference signal can be further improved. It is obvious that the high-frequency amplifier AMP can also be placed between the phase transfer means D and the summer SUM, or the high-frequency amplifier AMP can be totally excluded.

From the summer output OUT, the sum signal is fed to the pre-stage RF of the receiver, to be converted into a baseband signal to be demodulated in the demodulator DET. The demodulated signal is fed preferably to the analog-to-digital converter ADC to be converted into digital form. The conversion rate and conversion accuracy (resolution) of the analog-to-digital converter are selected so that calculation and adjustment can be made within the available time, preferably during one time slot and with a sufficient resolution. In the GSM mobile communication system operating in the 900 MHz frequency range, the length of one TDMA frame is 4.615 ms, wherein the length of one time slot is 577 µs. In some applications, the conversion rate and/or resolution can be arranged adjustable, wherein changes in noise conditions can better be taken into account in the adjustment.

The digital signal is fed to the digital signal processing unit DSP, in which the power of the received signal is advantageously calculated. This power calculation can be implemented e.g. by performing several successive measurements of the strength of the modulated signal for a predetermined time, e.g. 50 µs. These measurement values and the measuring time are used to calculate either the average or maximum power of the measuring time. The number of measurements to be made during said measuring time depends e.g. on the rate of the analog-to-digital converter ADC used. Increasing the conversion rate will typically raise e.g. the price and power consumption of the converter. On the other hand, the conversion rate can be increased by reducing the resolution.

On the basis of the result of the power calculation, the digital signal processing unit DSP generates an adjustment signal which is at this stage in digital form and is fed to a first regulator line REG1. The adjustment signal is a numerical value for example corresponding to the new voltage value to be set in the control line REG2 of the phase transfet means D, given in e.g. eight bits, wherein there are a total of 256 different control values. The adjustment signal is converted into an analog signal in the digital-to-analog converter DAC and fed to the regulator line REG2 of the phase transfer means D. This signal is used to change the phase difference produced by the phase transfer means D, for example to increase the phase shift, and a new power calculation is made in the digital signal processing unit DSP. If the new calculation indicates that the power of the received signal reduced, the control direction can be kept the same until a minimum value is achieved for the power of the received signal or the time reserved for the power calculation expires. If the power of the signal received on the basis of the adjustment increased, the control direction is changed, for example in this example the phase shift will be increased, and said minimum value is searched for the power of the received signal. Because the signal received in the idle slots I, N is not a useful signal, it can be assumed that all the signals received are interference signals whose intensity in the receiver can thus be minimized. At the stage when the minimum point is found or the power of the received signal is sufficiently low, or the time reserved for the power calculation expires, the control value of the phase transfer means D is locked into the value set on the basis of the measurement and the adjustment, preferably at least for the time of the next receiving time slot R. A new measurement and control stage is performed for example before the next receiving time slot, or if the noise conditions are not substantially changed, the control can also be made less frequently. In the next measuring time slot, the initial value used for the adjustment is preferably the control value obtained on the basis of the preceding measurement.

If interference signals do not occur to a significant extent, the receiver RX can be used normally without controlling the attenuation of interference. This may be necessary in situations in which the power consumption is to be reduced. Thus, for example the summing means SUM can be passed by with a switch (not shown) or the like, wherein the signal is received via the first antenna ANT1 only. Another alternative in such a situation is to set the phase response of the phase transfer means D in a predetermined default value, wherein a switch is not necessarily needed.

The operation of the wireless communication device of the invention in other respects, e.g. data transmission and control signalling between the base station and the wireless communication device, is known by a man skilled in the art, wherein it does not need to be discussed in more detail in this context.

It is obvious that the present invention is not limited solely to the embodiment presented above but it can be modified within the scope of the appended claims.

What is claimed is:

1. A method for reducing interference in a receiver for receiving information in receiving time slots, in which receiver signals are received with at least a first antenna (ANT1) and a second antenna (ANT2), characterized in that, on the basis of signals received with said first antenna (ANT1) and second antenna (ANT2) at moments of time other than in said receiving time slot, when no information is being received, a reference signal representing interference in said other time slot is formed and used for the tuning of the receiver in said receiving time slots.

2. The method according to claim 1, characterized in that the reference signal is generated by adjusting the phase of at least one received signal and mixing the signal with other received signals, and the power of the reference signal is determined, wherein the phase is adjusted to minimize the power of said reference signal.

3. The method according to claim 2, characterized in that a phase control value formed on the basis of the reference signal is used upon receiving information.

4. The method according to claim 2, characterized in that the phase control value formed on the basis of the reference signal is kept substantially constant at least for the time of the receiving time slot following the setting up of the phase control value.

5. The method according to claim 1, characterized in that the reference signal is formed on the basis of the signal received in the time slot preceding a receiving time slot.

6. The method according to claim 5, characterized in that the reference signal is formed less frequently than in every time slot preceding a receiving time slot.

7. A receiver for receiving information in receiving time slots, the receiver comprising at least a first antenna (ANT1) and a second antenna (ANT2) for receiving signals, characterized in that it comprises also means (D, SUM) for forming a reference signal on the basis of signals received with said first antenna (ANT1) and second antenna (ANT2) at moments of time other than in said receiving time slots, when no information is being received and means (D, DSP) for tuning the receiver on the basis of said reference signal to attenuate interference effective in the reception of information in said receiving time slots.

8. The receiver according to claim 7, characterized in that it is a TDMA receiver.

9. A wireless communication device comprising at least a receiver for receiving information in receiving time slots allocated for said wireless communication device (MS), as well as a first antenna (ANT1) and a second antenna (ANT2) for receiving signals, characterized in that the wireless communication device comprises also means (D, SUM) for forming a reference signal on the basis of signals received with said first antenna (ANT1) and second antenna (ANT2) at moments of time other than in said receiving time slots allocated for the wireless communication device, when no information is being received and means (D, DSP) for tuning the receiver on the basis of said reference signal to attenuate interference effective in the reception of information in said receiving time slots.

10. The wireless communication device according to claim 9, characterized in that the means for forming the reference signal comprise means for adjusting the phase of at least one received signal, means for mixing the signals received with the first and second antennas, means for determining the power of the mixed signal, and means for performing the adjustment of said phase on the basis of the power determination.

11. The wireless communication device according to claim 9, characterized in that it comprises a digital signal processing unit (DSP) arranged for performing the power determination.

12. A system comprising at least a data processor (PC), a receiver for receiving information in receiving time slots, and a first antenna (ANT1) and a second antenna (ANT2) for receiving signals, characterized in that the system comprises also means (D, SUM) for forming a reference signal on the basis of signals received with said first antenna (ANT1) and second antenna (ANT2) at moments of time other than in said receiving time slots allocated for the receiver, when no information is being received and means (D, DSP) for tuning the receiver on the basis of said reference signal to attenuate at least interference which is formed in a data processor (PC) and which is effective in the reception of information in said receiving time slots.

* * * * *